Sept. 4, 1973 W. UHRIG 3,756,885

METHOD OF WEAVING AND INTERLACING A MONOFILAMENT BETWEEN SEPARATE TAPE PARTS OF A SLIDE FASTENER

Filed May 7, 1971 3 Sheets-Sheet 1

INVENTOR
WILHELM UHRIG

Abraham A. Saffitz

ATTORNEY

INVENTOR:
WILHELM UHRIG
By Abraham A. Saffitz
ATTORNEY

Sept. 4, 1973 W. UHRIG 3,756,885

METHOD OF WEAVING AND INTERLACING A MONOFILAMENT BETWEEN SEPARATE TAPE PARTS OF A SLIDE FASTENER

Filed May 7, 1971 3 Sheets-Sheet 3

INVENTOR:
WILHELM UHRIG
By Abraham A. Saffitz
ATTORNEY

United States Patent Office 3,756,885
Patented Sept. 4, 1973

3,756,885

METHOD OF WEAVING AND INTERLACING A MONOFILAMENT BETWEEN SEPARATE TAPE PARTS OF A SLIDE FASTENER

Wilhelm Uhrig, Mannesmannstrasse 11, Wuppertal-Elberfeld, Germany

Filed May 7, 1971, Ser. No. 141,160
Claims priority, application Germany, May 13, 1970, P 20 23 413.3
Int. Cl. A44b *19/00;* B32b *7/08*
U.S. Cl. 156—148 13 Claims

ABSTRACT OF THE DISCLOSURE

A method of weaving two seperate tape parts of a slide fastener and apparatus therefor wherein the two tape parts comprising warp and weft threads are woven on a needle loom and are positioned one above the other. A continuous thermoplastic monofilament is interlaced between the tape parts to form meandering strand sections uniformly spaced apart and in uniform length, these sections being subsequently deformed, embossed, and molded into fastening links of the tapes. After folding and molding, the several plies of the tapes may be combined by sewing, adhesion or welding where thermoplastic warp and/or weft fibers are employed to provide a two-ply construction.

In the fastener manufacturing method according to my copending U.S. patent application Ser. No. 45,715, filed June 12, 1970, now U.S. Pat. No. 3,596,343, there is described and claimed a method for guiding and interlacing a continuous thermoplastic monofilament as a warp thread to form evenly spaced, link-forming plastic strand sections in the weaving method, and the supply may comprise an exceptionally long length of monofilament adapted for weaving at a high picking rate.

My aforementioned copending application explains the weaving method by reference to a Y-shaped tape or Y flank tape, wherein the two flanks of the tape form two weaving planes into which the link-forming monofilament is alternately interlaced as a warp thread. The end product of the method of my copending application is a slide fastener in which the fastening links are disposed between the two adjacent flanks of the Y flank tape and are covered by these flanks, and the links are constructed in a manner to be processed within the slide fastener plane. The slide fastener made according to this copending application has many advantages, especially its resistance to breaking open, its small size and its high degree of flexibility, but this Y-tape is not universally adopted for reasons of fashion, aesthetics and other technological reasons.

The method of the present invention provides different kinds of slide fasteners; for example, slide fasteners with link rows which are covered on both sides, on only one side, or not covered at all, and slide fasteners, in which the fastening engagement direction is disposed perpendicularly to the slide fastener plane. The present method and apparatus also produce non-symmetrical slide fasteners and slide fasteners with specially reinforced strong support beads which are adapted for guiding the slide.

It is an object of the present invention to provide new methods for manufacturing a variety of slide fasteners which are structurally different from the Y-tape fasteners of my copending patent application while retaining an efficient manufacturing method which provides advantages of resistance to opening, smallness of size and great flexibility.

In accordance with the present invention, two separate part tapes are woven in two weaving planes and the two tape parts are joined to each other after the weaving operation solely by means of meandering side parts of an interlaced thermoplastic monofilament, the two tape parts being superposed and parallel to each other so that the interlacing operation provides the fastening links of a slide fastener.

After weaving, folding and molding of the fastening links and in accordance with the present invention, the two part tapes are placed upon each other and are then combined by sewing, adhesive joining or welding, when weldable synthetic thermoplastic threads are used, to form thereby a multiple ply support tape which is at least a two-ply construction.

Since the two part tapes are separately woven and are combined into a support tape only after the folding and molding operations are performed on the fastening links, the present method makes it possible for many different forms to be manufactured as the final form of the slide fastener. Numerous variations in weaving may be provided even during the weaving operation; for example, by the two tape parts being woven either to the same width or to different widths in accordance with the invention, or the thermoplastic monofilament may be interlaced either in the middle longitudinal zone of the tape parts or near the edge of one or of both tape parts.

According to the invention, it may be desirable for the tape edges of both tape parts to be disposed perpendicularly upon each other during the weaving operation, at least on one side, so that the thermoplastic monofilament sections may be interlaced in both tape parts near the tape edges, and to this end, it is practical for the two tape parts to be woven so that they are directly superadjacently disposed or are laterally offset and superadjacently disposed.

In all of the previously described embodiments of the weaving method of the present invention, the link-forming thermoplastic monofilament is guided and interlaced as a warp thread, thus retaining the high speed and efficient production advantages of my copending patent application, Ser. No. 45,715. However, the different embodiments also provide differently dimensioned tape parts or tape flanks on both sides of the meander-shaped link members of the interlaced monofilament section which result in different finished shapes of the slide fastener. Means for selectively varying the shape and weave are provided not only on the weaving step but also in the folding and molding steps for making the fastening links and in the subsequent combining of the two tape parts into a support tape. For example, according to the present invention, it is possible for the two parts to be sewn together to form a Y-tape or a V-tape, and the side parts of the monofilament sections are folded into fastening links which extend from the space between the two flanks of the Y-tape or V-tape.

In a further embodiment of the invention, the flanks covering the fastening links on both sides may be joined to each other by means of a seam extending in the zone of the fastening links, so that the resistance to kinking and breaking open of the slide fastener is substantially increased. Alternatively, the flank part of one may be folded back or both flanks disposed between the interlacing position of the monofilament section and the support tape edge may be folded back to obtain a slide fastener in which the fastening links are covered on only one side or a slide fastener without any covering for the slide fastener links, as is described in greater detail hereinbelow.

According to the invention, it is also possible to omit the combination of the tape parts into a two-ply support tape after the tape parts have been woven, and, instead, it is possible for the two tape parts and for the monofilament side parts disposed therebetween to be swung open to form a ladder tape and the side parts being formed into tubular fastening links. These tubular fastening links are disposed perpendicularly on the plane of the opened ladder tape for fastening engagement which is oriented in a direction perpendicular to the support tape plane.

The invention will now be described by reference to the drawings, in which.

Figures 1, 2, 3, 4, 5:
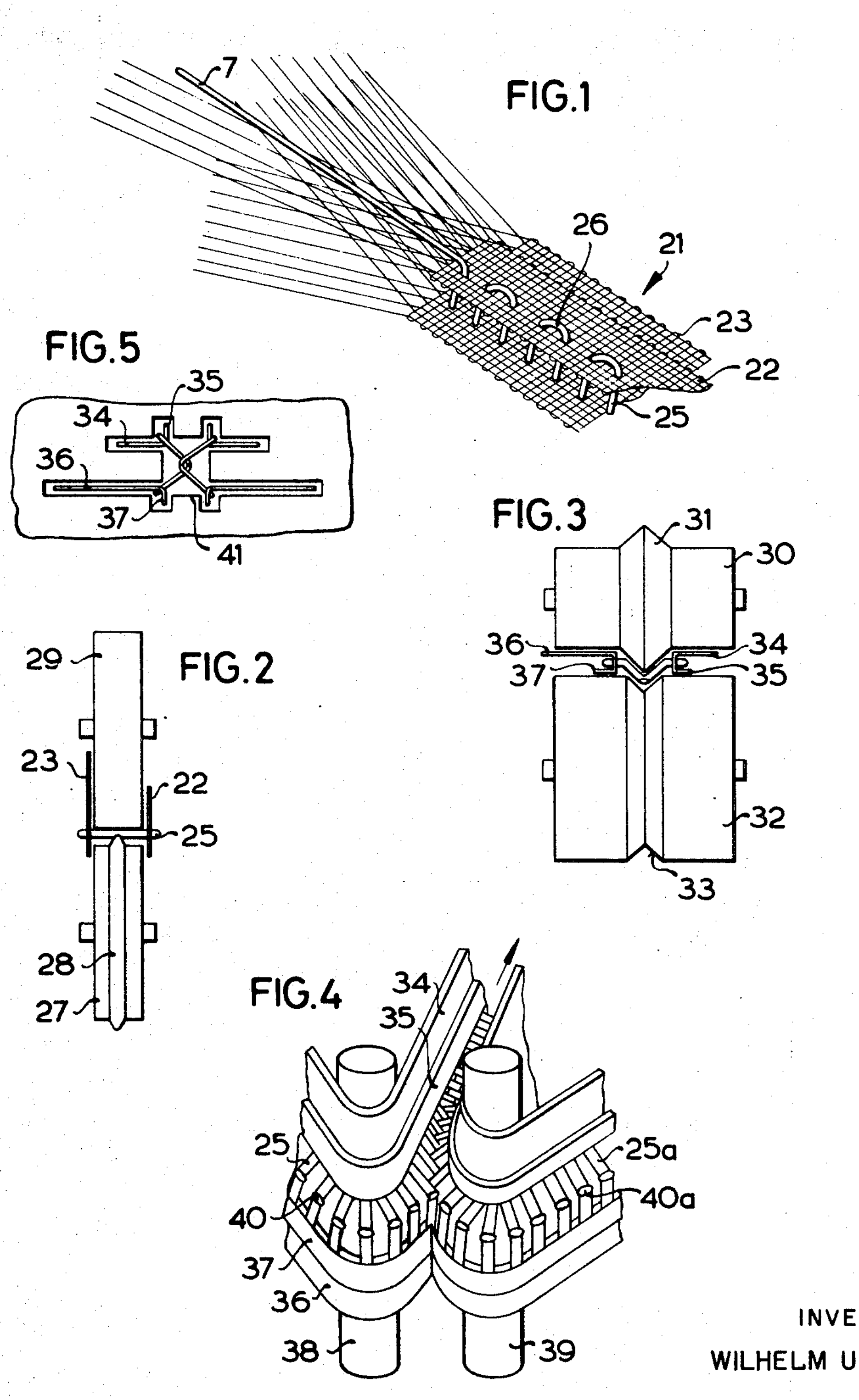
FIG. 1 is a diagrammatic view showing the weaving of a two-ply support tape and the alternating interlacing of a thermoplastic monofilament in the two parts of the support tape.
FIG. 2 is a diagrammatic view of the apparatus for embossing the fastening surfaces on the thermoplastic monofilament side parts disposed between the two support tapes.
FIG. 3 is a diagrammatic view of the apparatus in which the two parts are folded back and the thermoplastic monofilament side parts are pre-curved.
FIG. 4 is a diagrammatic view of the apparatus in which two support tapes are fastened to each other.
FIG. 5 is a diagrammatic view of the apparatus in which the folded part tapes are once again swung open.

In FIGS. 1 and 2, there is illustrated a support tape 21 obtained after weaving, comprising two tape parts 22 and 23 which are disposed superadjacently to each other and in parallel, each tape part 22 and 23 comprising textile weft and warp threads and a thermoplastic monofilament strand section 7 which is alternately interlaced into the two tape parts. As shown in FIG. 1, monofilament 7 is guided as a warp thread during weaving and changes from one tape part into the other after a defined number of pickes. Thus, the monofilament 7 extends in meander shape between the two tape parts, and the side parts 25 of the monofilament are disposed between the two tape parts and are subsequently molded into fastening links in a manner described hereinbelow. Adjacent side parts 25 are joined by arcuate loop portions 26, all of which, in the finished tape, serve as a slide guide line.

After the support tape 21 is woven, the side parts 25 pass through the embossing apparatus illustrated in FIG. 2 which comprises a heated roller 27 with embossing bead 28 and a mating roller 29. Each middle portion of the side parts 25 of the monofilament 7 is deformed by the embossing bead and the cross-section is broadened to provide the fastening surfaces of the finished slide fastener.

After forming the broadened cross-section in the embossing apparatus of FIG. 2, the support tape 21 then passes through the pre-curving apparatus which is illustrated in FIG. 3, this apparatus comprising a heated embossing roller 30 with a projecting embossing bead 31 and a mating roller 32 with depressed embossing groove 33. The side parts 25 are pre-curved by passing the support tape between the bead 31 and the groove 33 so that the cross-section of the middle portions assumes an approximate V-shape. The two flanks 34 and 35 of the tape part 22 disposed on the right-hand and left-hand side, respectively, of the interlacing point of the monofilament and the flanks 36 and 37 of the tape part 23 are now folded onto each other. This folding occurs between the roller sections on both sides on the bead 31 and the groove 33.

The two support tapes which have been embossed, precurved and folded in the apparatus of FIGS. 2 and 3 are now passed around the fastening engagement pins 38 and 39 of the fastening apparatus shown in FIG. 4. The flanks 34 and 36 of the support tape 21 face away from the precurved side parts 25 and pass directly along the pins 38 and 39. The pre-curved side parts 25 and 25*a* of the two support tapes are spread apart when passing around the pins 38 and 39 so that, upon passing between the pins 38 and 39, respective fastening surfaces 40 and 40*a* mutually grip behind each other. In this manner, the two support tapes are fastened to each other when they exit in the direction shown by the arrow in FIG. 4.

The fastened support tapes now pass through the gate shown in FIG. 5, this gate having a central aperture 41 for receiving the fastened side parts 25 and 25*a*. A short slit and a long slit adjoin at the corners of the rectangular aperture 41, these slits being disposed at right angles to each other for receiving the flanks 34, 35, 36 and 37 of the tape parts. Accordingly, when passing through the gate shown in FIG. 5, the flanks 34, 35, and 36, and 37, folded onto each other in FIG. 4, are once again swung open through 90° as shown in FIG. 5.

Figure 6:
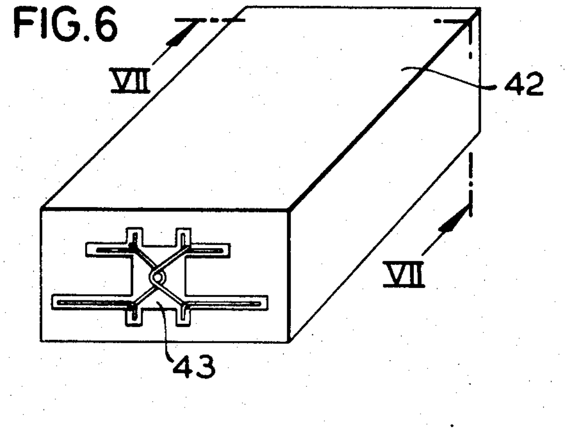
FIG. 6 is a diagrammatic view of a heated molding duct in a perspective front view.
Figure 7:
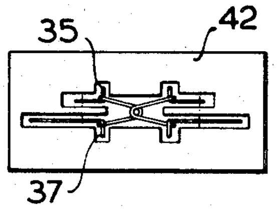
FIG. 7 is a diagrammatic view of the exit endface of the molding duct of FIG. 6.

In the next step, the fastened support tapes pass through a heated molding duct 42, shown in FIG. 6 and FIG. 7. The molding duct entry cross-section shown in FIG. 6 is identical with the gate aperture shown in FIG. 5. The gate shown in FIG. 5 could also be omitted, in which case the entry cross-section of the molding duct 42 performs the function of the gate of FIG. 5.

The entry cross-section of the molding duct 42 as shown in FIG. 6 merges continuously into the exit cross-section as in FIG. 7, and the middle duct section 43, which is still substantially square in FIG. 6 and accommodates the side parts 25 and 25*a*, first becomes progressively narrower transversely to the orientation of the fastening engagement and then broadens progressively in the direction of fastening engagement.

By passing through the molding duct, the pre-curved side parts 25 and 25*a* are folded onto each other with increasing pressure and attain their final fastening link form upon leaving the molding duct.

Figure 8:
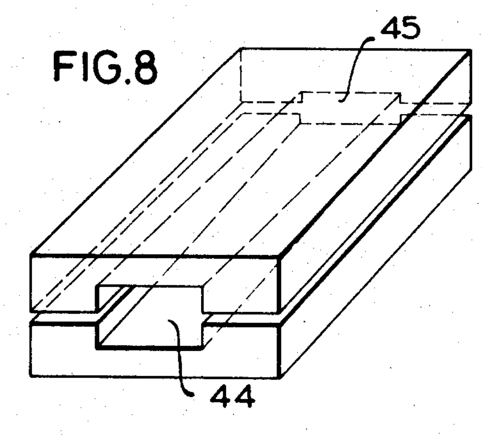
FIG. 8 is a diagrammatic view of an ironing duct.
Figure 9:
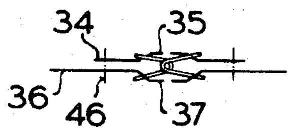
FIG. 9 is a cross-section through a slide fastener after passing through the ironing duct of FIG. 8.

The two coupled support tapes with the free support tape flank parts 35 and 37 disposed perpendicularly to the slide fastener plane are illustrated in the production stage in FIG. 7 and are now guided through the heated ironing duct illustrated in FIG. 8. The middle rectangular section of the ironing apparatus in FIG. 8 accommodates the fastening links and the flanks 35 and 37. The cross-section of the rectangular ironing duct 44 merges progressively into the substantially shallower, rectangular exit cross-section 45 so that, on passing through the ironing apparatus, the flanks 35 and 37 are folded inwardly on to the fastening links, and the slide fastener takes the final form shown in FIG. 9 in which the fastening links are covered on both sides by the flanks 35 nad 37. The two flank parts 34 and 36, adjoining rearwardly on the interlacing position of the monofilament strand section, are joined by means of a seam 46 in order to form the support tape.

Figure 10:
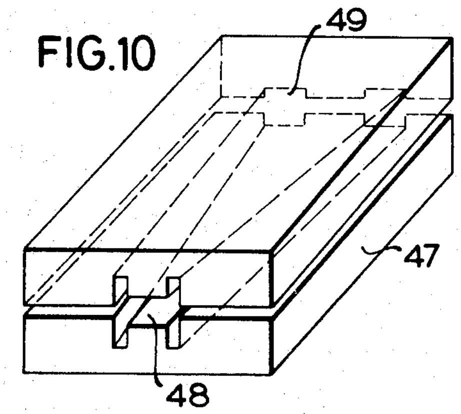
FIG. 10 is a view of an alternative embodiment of an ironing duct.
Figure 11:
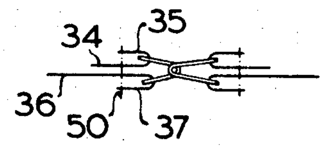
FIG. 11 is a cross-section through a slide fastener obtained after passing through the ironing duct of FIG. 10.

FIG. 10 shows an alternative embodiment of an ironing duct 47 which has an approximately H-shaped entry cross-section 48, the four members of the H-shaped entry cross-section being adapted to accommodate the flanks 35 and 37 of the support tape. As shown in the intermediate production stage illustrated in FIG. 7, flanks 35 and 37 still extend away from the slide fastener plane. The entry cross-section 48 of the ironing duct 47 merges progressively into the exit cross-section 49 in which the four H members of the entry cross-section are swung through 90° to the outside. Accordingly, when the support tapes pass through the ironing duct 47, the flanks 35 and 37 are folded back, thus resulting in the production of the slide fastener illustrated in FIG. 11 in which all four flanks 34, 35, 36 and 37 are sewn together by a common seam 50 to be combined into one support tape.

Figure 12:
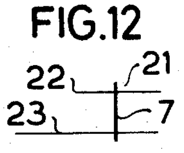
FIG. 12 is a diagrammatic cross-sectional view of the support tape of FIG. 1.
Figure 13:
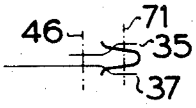
FIGS. 13, 14 and 15 show diagrammatic cross-sectional views of three different endforms of slide fastener halves produced from the support tape of FIG. 12.
Figure 14:
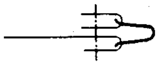
Figure 15:
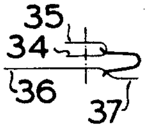

FIG. 12 shows in diagrammatic form a cross-section through the support tape of FIG. 1 as obtained after the weaving operation. FIG. 13 shows, by analogy to FIG. 9, a slide fastener half produced from the aforementioned support tape by the use of the ironing duct illustrated in FIG. 8. In contrast to FIG. 9, the flank parts 35 and 37, covering the fastening links in the embodiment of FIG. 13, are joined to each other by means of a seam 71 which extends in the side member zone of the fastening links. FIG. 14 shows in analogous manner the slide fastener half which is produced from the support tape according to FIG. 12 and by the use of the ironing duct illustrated in FIG. 10. By using an ironing duct comprising the upper half of the ironing duct of FIG. 8 and the lower half of the ironing duct of FIG. 10, it is possible to obtain the slide fastener half sketched in FIG. 15 in which the fastening links are covered only on one side by the flank 37 while the flanks 34 and 35 of the other tape part are folded back onto the flank 36 and are sewn together therewith.

Figure 16:
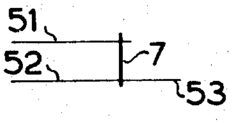
FIG. 16 is a diagrammatic view of an alternative embodiment of a support tape after the weaving operation.
Figure 17:
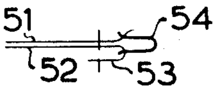
FIG. 17 is a diagrammatic view of a slide fastener half produced from the support tape of FIG. 16.

In FIGS. 12 to 15, the thermoplastic monofilament strand sections are shown in interlaced relation in the middle zone of the tape parts 22 and 23. FIG. 16 shows a support tape in which the thermoplastic monofilament strand section is interlaced near the tape edge of tape part 51 and in the middle zone of another tape part 52, 53, In the finished slide fastener half of FIG. 17, the flank 53 is folded back onto the flank 52, the side parts are folded so as to extend towards the support tape edge, and the tape part 51 is sewn to the two flanks 52 and 53 to form a support tape. Thus, FIGS. 12–17 show different locations of the monofilament 7 which may be useful in different forms of fasteners.

Figure 18:
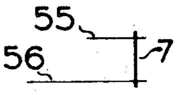
FIG. 18 is a view of a further embodiment of a support tape obtained after the weaving operation.
Figure 19:
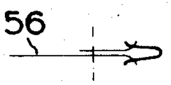
FIGS. 19 and 21 are diagrammatic views which show different kinds of a slide fastener half produced from the support tape of FIG. 18.

In the embodiment illustrated in FIG. 18, the thermoplastic monofilament strand section 7 of both tape parts 55 and 56 is interlaced near the tape edge. Sharp folding or kinking of the side parts of the monofilament 7 and placing together of the tape parts 55 and 56 produces the finished slide fastener illustrated in a half part in FIG. 19 and, in the same manner as in the earlier examples, the fastening engagement direction is disposed in parallel to the principal plane of the slide fastener.

Figure 20:
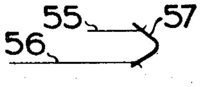
FIG. 20 is a view showing an intermediate production stage for the final form of FIG. 21.
Figure 21:
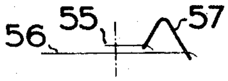

However, it is also possible to produce slide fasteners from the support tape of FIG. 18 in which the fastening engagement direction is perpendicular to the slide fastener plane. In this case, the side parts of the monofilament 7 are kinked into a V-shape, for example, by means of the apparatus illustrated in FIG. 3, the angle of kinking of the V-shaped fastening links 57 amounting to approximately 90° (see also FIG. 20). The V-shaped fastening links 57 are subsequently folded around their interlacing position onto the tape part 56 after which the tape part 55 is sewn onto the tape part 56. The fastening engagement direction of the fastening links 57 is therefore oriented perpendicularly to the principal plane of the slide fastener (FIG. 21).

Figure 22:
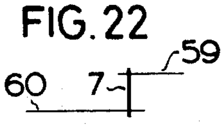
FIG. 22 is a view showing a further embodiment for a support tape obtained after the weaving operation.
Figure 23:
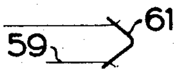
FIGS. 23 and 24 are views which show a slide fastener half produced from the support tape according to FIG. 22.
Figure 24:
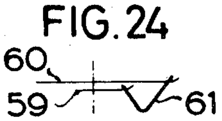

While in the embodiment illustrated in FIG. 18 the tape parts 55 and 56 are woven so as to be displaced directly superadjacently, FIG. 22 discloses an embodiment in which the tape parts 59, 60 are woven so as to be disposed superadjacently with a lateral offset. The monofilament 7 is once again interlaced near the tape edge of both tape parts. The slide fastener half illustrated in FIG. 24 can be produced from the support tape according to FIG. 22 by V-shaped kinking of the fastening links 61 (see FIG. 23) and by folding the fastening links and the tape part 59 onto the underside of the tape part 60, the slide fastener half being a finished product which is identical to the slide fastener half illustrated in FIG. 21. As can be readily seen, the slide fastener half in accordance with FIG. 19 may also be formed from the support tape according to FIG. 22.

Figure 25:
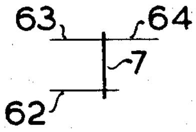
FIG. 25 is a view which shows a further embodiment for a support tape obtained after the weaving operation.
Figure 26:
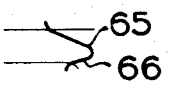
FIGS. 26 and 27 are views which show a slide fastener half with non-symmetrically formed slide fastener links, produced for the support tape according to FIG. 25.
Figure 27:
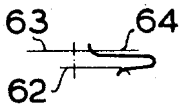

FIG. 25 discloses a support tape which is similar to that of FIG. 16 and in which the monofilament 7 is interlaced near the tape edge of tape part 62 and in the middle zone of the other tape part 63, 64. As can be seen from FIG. 26, the side parts of the monofilament 7 are, in this case, kinked to form V peaks with side members 65, 66 of different length, the shorter members 66 being disposed on the side of the support tape 62. In accordance with the final slide fastener shape illustrated in FIG. 27, the two flanks 62, 63 are sewn together while the flank 64 covers the longer members of the fastening links.

Figure 28:
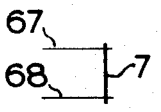
FIG. 28 is a view which shows a further embodiment of a support tape obtained after the weaving operation; and, FIGS. 29 and 30 are views which show a slide fastener half produced from the support tape of FIG. 28.
Figure 29:
Figure 30:
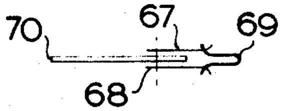

Finally, FIG. 28 shows an embodiment of a woven support tape in which the monofilament 7 is interlaced at the tape edge by two directly superadjacently disposed and relatively narrow tape parts 67, 68. By passing through the intermediate stage illustrated in FIG. 29, the side parts of the thermoplastic monofilament section 7 are folded into fastening links 69 which are oriented towards the support tape edge. A broader sewing tape 70 is inserted between the two tape parts 67, 68 and the three tapes 67, 68 and 70 are sewn together to form an integral support tape. The finished product, the slide fastener according to FIG. 30, corresponds to the slide fastener disclosed by the British patent specification No. 826,403, but, based on the method of guiding and interlacing the link-forming monofilament as a warp thread instead of as a weft thread, as in the present invention, the product of the present invention is made with greater production efficiency and at lower cost.

What is claimed is:

1. A method for manufacturing a fastener slide comprising:

weaving two supporting tapes, each of them consisting of two tape parts lying parallelly at different vertical levels, each tape part comprising textile weft and warp threads, interlacing a thermoplastic monofilament warp thread alternately between the two tape parts as the only weaved connection between the two tape parts to form a row of exposed monofilament sections oriented orthogonally like the crossbars of a ladder between the two tape parts, the row of monofilament sections dividing each tape part into two flanks;

providing broadened cross-sections at each middle portion of the monofilament sections;

folding the flanks of each tape part outwardly onto each other;

pre-curving the monofilament sections to assume approximate V-shape;

assembling the two supporting tapes by coupling their pre-curved monofilaments sections;

folding the coupled pre-curved monofilaments sections onto each other to attain their final fastening link form; and joining the two tape parts of each supporting tape to each other.

2. A method in accordance with claim 1, wherein the two tape parts are each woven to the same width.

3. A method in accordance with claim 1, wherein the two tape parts are woven to different widths.

4. A method as claimed in claim 1, wherein the thermoplastic monofilament is interlaced into the middle longitudinal zone of each of the two tape parts.

5. A method as claimed in claim 1, wherein the thermoplastic monofilament is interlaced near the edge of one tape part and in the middle zone of the other tape part.

6. A method as claimed in claim 1, wherein the two tape parts are disposed perpendicularly and superadjacently to each other on at least one side and said thermoplastic monofilament is interlaced near the edge of the tape.

7. A method as claimed in claim 6, wherein the two tape parts are woven in a position of one tape being disposed directly above the other.

8. A method as claimed in claim 6, wherein the tape parts are woven in laterally offset superadjacent relation to each other.

9. A method as claimed in claim 1, wherein the two tape parts are sewn together to form a V-tape with the side parts of the thermoplastic monofilament sections being folded into fastening links extending beyond the space between the two flanks of the tape.

10. A method according to claim 9, wherein parts of the tape cover the fastening links on both sides and these covering parts are joined to each other by a seam extending along the longitudinal zone of the fastening links.

11. A method according to claim 9, wherein a portion of one of the tape parts is folded back at the support tape edge.

12. A method according to claim 3, wherein the tape parts of different width provide a narrow tape part and a wide tape part, and the narrow tape part is folded back to form a two-ply tape lying alongside the interlaced thermoplastic monofilament strand sections, and wherein said narrow tape part is secured in folded back condition on the other tape part.

13. A method as claimed in claim 12, wherein said narrow tape part is sewn on its near side to the wide tape part with the side sections of the thermoplastic monofilament being placed on the wide part and being folded and molded into fastening links for fastening engagement along a direction which is perpendicular to the plane of the support tape.

References Cited

UNITED STATES PATENTS

| | | | |
|---|---|---|---|
| 3,482,290 | 12/1969 | Uhrig | 24—205.13 C |
| 3,149,387 | 9/1964 | Ruhrmann et al. | 24—205.13 C |
| 3,551,962 | 1/1971 | Uhrig | 24—205.1 C |
| 3,409,952 | 11/1968 | Uhrig | 24—205.1 C |
| 3,359,604 | 12/1967 | Glindmeyer | 24—205.1 C |

PHILIP DIER, Primary Examiner

U.S. Cl. X.R.

24—205.1 C, 205.13 C; 29—33.2; 154—201